United States Patent
Hervet et al.

(10) Patent No.: US 12,390,969 B2
(45) Date of Patent: Aug. 19, 2025

(54) METHOD FOR MANUFACTURING AN INJECTION-MOLDED ARTICLE, IN PARTICULAR A BOTTLE PREFORM

(71) Applicant: L'OREAL, Paris (FR)

(72) Inventors: Jean-Marie Hervet, Clichy (FR); Judith Veniez, Aulnay sous Bois (FR); Aurelien Petit, Aulnay sous Bois (FR); Olivier Farnault, Aulnay sous Bois (FR)

(73) Assignee: L'OREAL, Paris (FR)

( * ) Notice: Subject to any disclaimer, the term of this patent is extended or adjusted under 35 U.S.C. 154(b) by 484 days.

(21) Appl. No.: 17/618,227

(22) PCT Filed: Jun. 10, 2020

(86) PCT No.: PCT/EP2020/066024
§ 371 (c)(1),
(2) Date: Dec. 10, 2021

(87) PCT Pub. No.: WO2020/249585
PCT Pub. Date: Dec. 17, 2020

(65) Prior Publication Data
US 2022/0266490 A1    Aug. 25, 2022

(30) Foreign Application Priority Data
Jun. 14, 2019    (FR) ..................... 1906379

(51) Int. Cl.
*B29C 45/72*    (2006.01)
*B29C 45/00*    (2006.01)
(Continued)

(52) U.S. Cl.
CPC ...... *B29C 45/7207* (2013.01); *B29C 45/0001* (2013.01); *B29C 49/0005* (2013.01);
(Continued)

(58) Field of Classification Search
CPC ............ B29C 45/7207; B29C 45/0001; B29C 49/0005; B29C 49/06; B29C 49/6472;
(Continued)

(56) References Cited

U.S. PATENT DOCUMENTS 8,171,705 B2    5/2012  Mitadera et al.
2006/0159797 A1*  7/2006  Lee ................... B29C 45/1684
                                            425/525

(Continued)

FOREIGN PATENT DOCUMENTS

JP          2003-53826 A       2/2003
KR     10 2018 0117936 A      10/2018
WO       WO 2019/208500 A1    10/2019

OTHER PUBLICATIONS

International Search Report issued on Sep. 10, 2020 in PCT/EP2020/066024 filed on Jun. 10, 2020, 6 pages.
(Continued)

*Primary Examiner* — Alison L Hindenlang
*Assistant Examiner* — Erica Hartsell Funk
(74) *Attorney, Agent, or Firm* — Oblon, McClelland, Maier & Neustadt, L.L.P.

(57) ABSTRACT

A method for manufacturing an injection-molded article, preferably a preform (11) of a bottle (1), in particular an aerosol bottle, made of a crystallizable polymer material, this article having at least one crystallized part (3), in particular a neck, and preferably a tubular body (14) closed at one end (16), the method comprising the following steps: a) producing an injection-molded article, preferably an injection-molded preform (11), by injecting the crystallizable polymer into a mold, b) crystallizing said part (3) of the injection-molded article, in particular of the injection-molded preform, by heating and then cooling the latter, wherein, in said method, between step a) and step b), the injection-molded article, in particular the injection-molded (Continued)

preform (11), is held for a sufficient duration under storage conditions such that it undergoes moisture uptake of at least 0.4% by weight.

15 Claims, 4 Drawing Sheets

(51) Int. Cl.
    *B29C 49/00*     (2006.01)
    *B29C 49/06*     (2006.01)
    *B29C 49/12*     (2006.01)
    *B29C 49/64*     (2006.01)
    *B29L 31/00*     (2006.01)

(52) U.S. Cl.
    CPC .............. *B29C 49/06* (2013.01); *B29C 49/12* (2013.01); *B29C 49/6472* (2013.01); *B29C 2045/7264* (2013.01); *B29C 2945/76625* (2013.01); *B29C 2945/76903* (2013.01); *B29C 2949/0863* (2022.05); *B29K 2995/004* (2013.01); *B29L 2031/7142* (2013.01); *B29L 2031/7158* (2013.01)

(58) Field of Classification Search
    CPC .... B29C 2949/0863; B29C 2045/7264; B29K 2995/004; B29L 2031/7142; B29L 2031/7158
    See application file for complete search history.

(56) References Cited

U.S. PATENT DOCUMENTS

2017/0267835 A1\*   9/2017   Groos .................. C08K 5/0041
2018/0179377 A1     6/2018   Bayer et al.

OTHER PUBLICATIONS

French Preliminary Search Report (with English translation of Categories of Cited Documents) issued on Feb. 20, 2020 in French Application 1906379 filed on Jun. 14, 2019, 3 pages.

\* cited by examiner

METHOD FOR MANUFACTURING AN INJECTION-MOLDED ARTICLE, IN PARTICULAR A BOTTLE PREFORM

TECHNICAL FIELD

The present invention relates to the manufacture of finished and semifinished products, in particular bottles, and more particularly aerosol bottles, that is to say pressurized bottles intended to receive a composition and a propellant gas, in particular a liquefied propellant gas. The invention also relates to pump-action bottles, that is to say those on which a pump is fitted.

PRIOR ART

It has been proposed to produce aerosol bottles from thermoplastic material.

To this end, a preform is produced by injection-molding a thermoplastic material, for example PET, with a neck intended for the fastening of a dispensing head. In order to improve the mechanical strength of the neck, the plastic material is subjected to a crystallizing heat treatment in the region of said neck. Next, the preform is transferred to a blow-molding station in order to give the body of the bottle its final shape. While reinforcing the mechanical strength, crystallization makes it possible make the bottle lighter.

A plastic aerosol bottle should comply with regulations. Tests on a plastic aerosol bottle containing a liquefied gas are generally more difficult to satisfy than those relating to plastic aerosol bottles containing a compressed gas.

The tests make it possible to verify that the plastic pressurized bottle is able to resist an operating pressure of generally several bar on account of the presence of a pressurized gas, notably a pressurized liquefied gas, inside it. This resistance has to be verified at a relatively high temperature in order to ensure safety in use. Furthermore, since the bottle can be filled under vacuum, this ensures squeeze resistance when the reduced pressure is at a maximum, before filling is started. The bottle also has to be resistant to impacts, notably to being dropped at different temperatures.

JP 2003 053826 discloses an apparatus for producing a neck part-crystallized preform. The apparatus comprises a preform molding apparatus for the injection-molding of the preform, a neck part crystallization apparatus for crystallizing the neck part of the preform and a first conveyance line for conveying the preform from the molding apparatus to the crystallization apparatus wherein the conveyance line comprises a humidity controller for allowing the preform to absorb moisture.

DISCLOSURE OF THE INVENTION

In-house tests carried out have shown that the heat treatment, which is effected for example with the aid of lamps emitting infrared radiation, does not always result in the desired mechanical characteristics, in particular those required for a bottle intended to receive a liquefied propellant gas, in a perfectly reproducible manner.

SUMMARY OF THE INVENTION

The invention aims to remedy this problem and the subject thereof, according to a first of its aspects, is a method for manufacturing an injection-molded article, preferably a preform of a bottle, in particular an aerosol bottle, made of a crystallizable polymer material, this article, in particular this preform, having a crystallized part and preferably a tubular body closed at one end, the method comprising the following steps:

a) producing an injection-molded article, in particular an injection-molded preform, by injecting the crystallizable polymer into a mold, b) crystallizing said part of the injection-molded article, in particular of the injection-molded preform, by heating and then cooling the latter, wherein, in said method, between step a) and step b), the injection-molded article, in particular the injection-molded preform, is held for a sufficient duration under storage conditions such that it undergoes moisture uptake of at least 0.4%, better still at least 0.8%, and even better still at least 1%, by weight, the uptake being preferably less than 3% by weight.

Although the invention applies preferably to an injection-molded article constituting a preform, the invention can apply to other injection-molded articles constituting finished or semifinished products. Thus, although the following description relates most particularly to a preform, the features of the invention are applicable to other injection-molded articles.

Said part that is crystallized may be the neck of the preform.

During the injection-molding of the article, in particular of the preform, the moisture content of the plastic material is relatively low, typically around 100 ppm. The invention is based on the finding that such moisture uptake makes it possible to improve the thermal conductivity of the material of the article, in particular of the preform, and thus to facilitate the action of the crystallizing heat treatment, which can thus be effected under conditions that bring about a satisfactory and reproducible result. The presence of moisture can in particular make it easier to obtain a desired crystallinity gradient within the crystallized part, in particular the neck.

The thermoplastic material used during the injection-molding of the article, in particular of the preform, is conventionally dehydrated. Thus, when the article, in particular the preform, leaves the mold in which it has been injection-molded, the water content of the plastic material is zero or virtually zero.

Its moisture uptake subsequently depends on its storage conditions until the following step of heat treatment of the part to be crystallized, in particular the neck.

The greater the relative humidity, and the longer the storage duration, the greater the moisture uptake.

The moisture uptake can thus be promoted by placing the article, in particular the preform, in an environment having a relatively high relative humidity.

Thus, the relative humidity during storage is preferably at least 30%, better still at least 60%, or even better still at least 80%. The relative humidity level desired can be achieved by humidifying the environment around the preform, for example by virtue of a suitable air conditioning system. In a variant, the relative humidity is brought about by the atmospheric conditions outside the storage location, and in this case the storage duration may be variable in order to allow time to obtain the desired level of moisture uptake. In the event of dry weather, this duration could be prolonged, compared with storage during wet weather.

The storage duration is chosen as a function of the relative humidity during storage, and may be at least 7 days, or even at least 15 days, 1 month, 3 months or 1 year.

The storage temperature is preferably between 5° C. and 35° C., better still between 15 and 25° C.

The injection-molded article, in particular the injection-molded preform, can be stored in a large bag during the moisture uptake, optionally provided with holes for facilitating exchanges with the ambient air.

Preferably, the crystallizable polymer material is PET, although the invention is not limited to this polymer. Thus, the plastic material used may include at least one polymer chosen from the group consisting of PET or PETP (polyethylene terephthalate), PEN (polyethylene naphthalate), PCT (polycyclohexylenedimethylene terephthalate), recycled polymers, in particular referred to as PCR (post-consumer recycled) polymers, in particular recycled PET, bioPET (biological polyethylene terephthalate), PP (polypropylene), PE (polyethylene), PEF (polyethylene furanoate), PET-G/PCT-G (glycolized polyethylene terephthalate/glycolized polycyclohexylenedimethylene terephthalate), PET with mineral fillers, for example calcium carbonate or glass fibers, PC (polycarbonate), POM (polyoxymethylene), SMMA (styrene methyl methacrylate), PMMA (polymethyl methacrylate), SAN (styrene acrylonitrile), PBT (polybutadiene terephthalate), PA6 (polyamide 6), PA12 (polyamide 12), PEEK (polyether ether ketone), PPO (polyphenylene oxide), PSU (polysulfone), filled polymers, in particular with mineral fillers and/or glass fibers, and mixtures thereof, including with organic or inorganic pigments or colorants.

The crystallization step, in particular of the neck, can be carried out with the aid of a heating device having at least one infrared radiation lamp or any other energy input means.

The heating device is preferably adjusted so as to apply a temperature gradient for obtaining the desired degrees of crystallinity. The heating temperature may be nonuniform. The distance between the heating device and the preform may be adjusted to this effect.

The heating device is preferably arranged in such a way as to prevent crystallization of the tubular body of the preform, which will be heated later and then subjected to the blowing operation.

At least one cooling bar may be brought close to the preform from the inside or outside thereof, simultaneously with the heating. In a variant or additionally, it may be introduced into the preform simultaneously with the heating, notably via the opening in the neck of the preform. Such a cooling bar serves to cool the zone that is not intended to be crystallized and also to achieve a gradient between the heated zone, where the maximum degree of crystallinity is obtained, and the unheated zone, where the degree of crystallinity is at a minimum. Another cooling system, different than a cooling bar, may be provided for the same purpose without departing from the scope of the invention.

The bottle may contain a cosmetic or other product.

The bottle may contain a liquefied or compressed gas, with an overpressure of between 1 and 13 bar ($10^5$ and $13.10^5$ Pa) at 20° C. The bottle may also receive a pump crimped to the neck, and not be pressurized.

The bottle may have a dispensing system for dispensing the cosmetic product contained therein, provided with an actuating member that the user can press in order to dispense the product through at least one outlet orifice, for example in the form of a spray, a foam, a gel or a cream. The dispensing system has for example a push button and a cup, fastened to the container, bearing a valve with a hollow control stem which is controlled by being depressed or tilted.

The bottle may also have a system of the Bag-on-Valve (BoV) type, having an aerosol valve with a welded bag. In this case, the composition is placed inside the bag while the propellant fills the space around the bag inside the bottle. The composition is dispensed by the propellant by simply pressing the bag. When the actuating member is depressed, the composition is extracted from the bag by the pressure of the propellant, this causing the composition to be dispensed in particular in the form of a spray, cream or gel.

A further subject of the invention is a method for manufacturing a bottle, in particular an aerosol bottle, wherein the bottle is formed by stretch-blow-molding the preform having a crystallized neck obtained by the method as defined above.

A further subject of the invention is the bottle, in particular aerosol bottle, obtained by the implementation of this method.

The invention may be understood better from reading the following detailed description of a nonlimiting illustrative embodiment thereof and from studying the appended drawing, in which:

DETAILED DESCRIPTION

Figure 1:
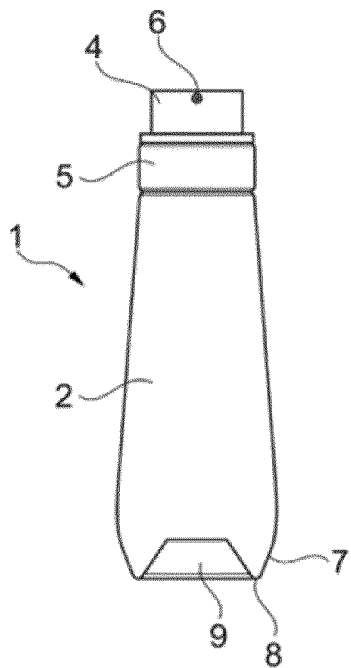
FIG. 1 shows an example of an aerosol bottle according to the invention.

FIG. 1 shows an example of an aerosol bottle 1 produced by implementing the method according to the invention.

Figure 3:
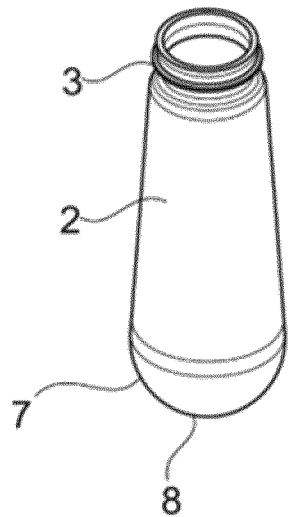
FIG. 3 shows the body of the bottle after the blow-molding of the preform, on its own.

This aerosol bottle 1 has a body 2 made of thermoplastic material, shown on its own in FIG. 3, having a neck 3 on which there is mounted a dispensing head 5 having a push button 4 equipped with a dispensing nozzle 6 and which the user can press to cause the contents of the bottle to be dispensed.

The dispensing head 5 has a cup bearing a valve, which can be fastened to the neck 3 by snap-fastening, crimping or any other means, and have a dip tube (not visible) extending down to the bottom of the bottle.

In the example in question, the bottle contains a composition to be dispensed, for example a cosmetic composition, and a liquefied propellant gas, for example butane.

The body is made from PET, but other thermoplastic materials may be suitable.

The neck 3 is at least partially crystallized, while the rest of the body 2 is in an amorphous form. In the case of PET, the amorphous nature causes the material to be transparent, while the crystallization gives it a whitish opacity.

The crystallization of the neck 3 makes it possible to improve the mechanical characteristics thereof.

Figure 4:
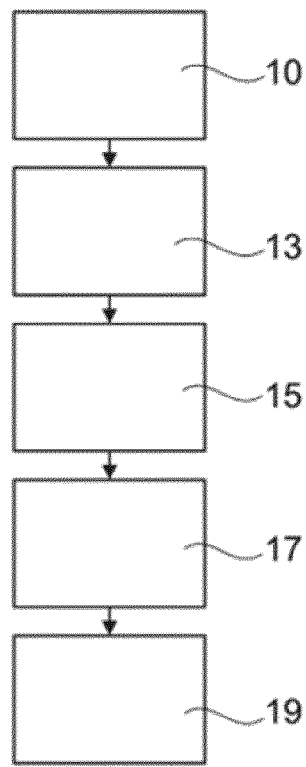
FIG. 4 is a block diagram of a manufacturing method according to the invention.

The manufacture of the body 2 will now be described with reference to FIG. 4 in particular.

Figure 2:
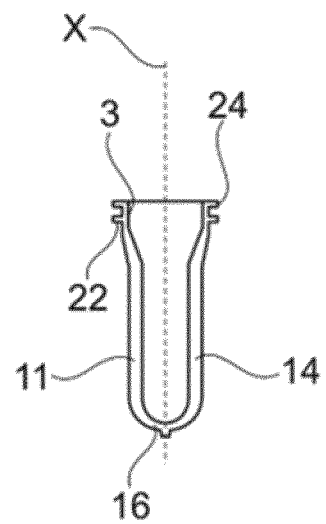
FIG. 2 shows the preform on its own.

First of all, in the step 10, a preform 11, as shown schematically in FIG. 2, is produced by injection-molding.

This preform 11 already has the neck 3 with its final shape, and a tubular body 14 closed at one end 16. The neck 3 may have a flange 22 at its base, this being useful for blow-molding, making it possible to form an end-stop that rests on the blow-molding mold and is likewise useful for conveying the preform 11 or the body 2 of the bottle, during the preheating of the preform and/or blow-molding and/or after blow-molding during the cooling phase. The neck 3 has in its upper part an annular bulge 24 that serves for attaching the dispensing system.

According to the invention, the preform 11 undergoes a moisture uptake step 13 under conditions chosen such that this moisture uptake is at least 0.4% by weight.

Thus, the weight of the preform after moisture uptake is greater by a factor of at least 1.04 than that of the preform before moisture uptake.

In order to obtain the desired moisture uptake, it is possible to store a large number of preforms 11 in a large bag in an air-conditioned store exhibiting a temperature and a humidity that are controlled such that the temperature is between 15 and 25° C. and the relative humidity is at least 30% RH, better still at least 60% RH, even better still at least 80% RH. The storage duration is chosen depending on the storage conditions so as to result in the desired moisture uptake. It is for example at least 7 days, better still at least 15 days.

Next, the preform 11 is subjected to a crystallizing heat treatment 15 of the neck 3, by exposing the neck 3 of the preform 11 to a heating means employing infrared radiation for example. Examples of heating devices that can be used to effect this heat treatment are described below.

Figure 5:
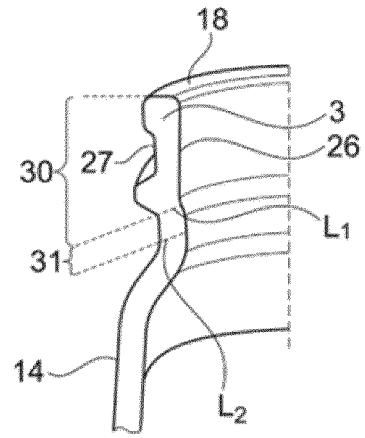
FIG. 5 is a schematic view in partial section of the preform.

The crystallizing step is preferably implemented in such a way as to obtain, in the neck 3, a first zone 30 and a second zone 31, intermediate between the first zone 30 and the tubular body 14, as illustrated in FIG. 5, having a degree of crystallinity lower than that of the first zone, this second zone extending axially over a height of at least 0.5 mm, and in such a way that the polymer material of the tubular body 14 remains in an amorphous state.

The first zone 20 is located between the upper end 18 of the neck 3 and a lower end at the boundary with the upper end of the second zone 31. This boundary between the first zone 30 and the second zone 31 is embodied, in a virtual manner in FIG. 5, by a line $L_1$ consisting of a boundary surface between these two zones 30 and 31. The second zone 31 is delimited at the top by this line $L_1$ and at the bottom by the line $L_2$, which is a virtual line, consisting of a boundary surface between the second zone 31 and the tubular body 14. Even though it belongs to the neck 3 of the preform 11, the second zone 21 constitutes an intermediate zone between the neck 3 and the tubular body 14. The boundary surfaces $L_1$ and $L_2$ are not perpendicular to the longitudinal axis X of the preform 11 but form a conical surface exhibiting a half cone angle α equal to approximately 60° with the axis X, as can be seen.

The two boundary surfaces have the same angle α in this example, but the situation could be otherwise without departing from the scope of the invention.

The second zone 31 has a mass-fraction degree of crystallinity lower than that of the first zone 30, which is preferably nonuniform within the second zone 31. The mass-fraction degree of crystallinity of the tubular body 14 is close to zero, the polymer material being in an amorphous state in this part of the preform 11, or in a semicrystalline state if the preform is made of PP or PE.

The first zone 30 of the neck is white in color, the tubular body 14 for its part remaining substantially transparent, whereas the, intermediate, second zone 31 of the neck 3 has a milky appearance, with beige-grey tones, with its visual appearance potentially being nonuniform. The light transmission percentage is higher in the zone of the tubular body 14 than in the second zone 31, which itself has a light transmission percentage that is higher than in the first zone 30, in particular at the wavelength of 973 $cm^{-1}$. This is connected with the fact that the higher the degree of crystallinity, the lower the light transmission percentage.

The second zone 31 thus forms not only an intermediate zone between the first zone 30 and the tubular body 14 but also a transition zone in terms of degree of crystallinity because the latter is at a maximum in the first zone 30 and at a minimum in the tubular body 14. The presence of this transition zone makes it possible to improve the mechanical properties, in particular the mechanical strength, of the bottle. The bottle produced from the preform 11 may thus be able to withstand the temperature of 75° C.

The degree of crystallinity in the second zone 31 is preferably nonuniform, varying within this zone, either linearly or nonlinearly, in the radial and/or axial direction(s).

In the example illustrated, the degree of crystallinity in the second zone 31, in the axial direction, decreases substantially linearly from the line $L_1$ toward the line $L_2$. Similarly, in the example illustrated, the degree of crystallinity in the second zone 21, in the radial direction, decreases substantially linearly from the outer surface 27 toward the inner surface 26.

Figure 6:
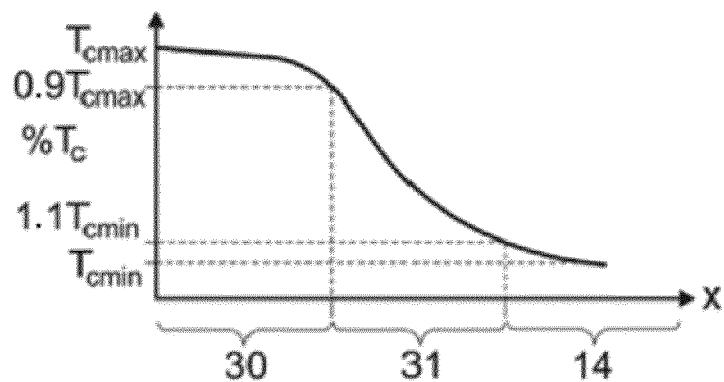
FIG. 6 illustrates an example of the change in crystallinity within the preform, in the longitudinal direction.
Figure 7:
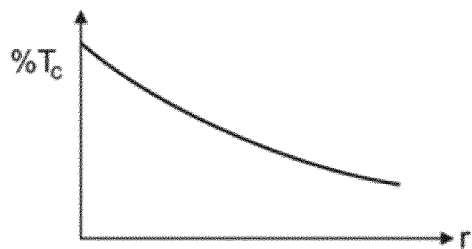
FIG. 7 illustrates an example of the change in crystallinity in the radial direction, FIG. 8 schematically shows an example of a device for the heat treatment of the preform.

Thus, in this example, the degree of crystallinity varies axially and radially in the second zone 31, as illustrated in FIGS. 6 and 7.

The degree of crystallinity may be expressed in the form $T_c(x, r)$. The degree of crystallinity may exhibit symmetry of revolution, meaning that $T_c(x, r)$ is constant regardless of the azimuth θ about the longitudinal axis X. Alternatively, $T_c(x, r)$ varies with the angle θ.

The transition between the first zone 30 and the second zone 31, for a given r, may be considered, by definition, to extend axially between 0.9 $T_{c\ max}$ and 1.1 $T_{c\ min}$, where $T_{c\ max}$ denotes the highest degree of crystallinity of the first zone and $T_{c\ min}$ the least high degree of crystallinity of the tubular body.

It is thus possible to obtain a boundary surface defined by the points in which $T_c(x)=0.9\ T_{c\ max}$ when r varies, and another boundary surface defined by the points at which $T_c(x)=1.1\ T_{c\ min}$ when r varies.

Each of these boundary surfaces may be substantially conical with a vertex half angle α with respect to the axis X.

The flange 22 may be formed on the circumference of the neck 3 in the lower part of the first zone 30, in particular at the lower end of the first zone 30, which in this case may define the boundary with the second zone 31.

The mass-fraction degree of crystallinity of the neck 3 in the first zone 30 is preferably between 20% and 80%, in particular between 25% and 50%, preferably between 25% and 40%, the mass-fraction degree of crystallinity of the neck in the first zone 30 preferably being substantially uniform axially and radially. The degree of crystallinity may be substantially uniform over the entire height of the first zone, which may be between 7 and 11 mm, being for example equal to 9 mm.

The mass-fraction degree of crystallinity in the second zone 31 of the neck 3 is for example between 8% and 20%.

The degree of crystallinity preferably exhibits, as indicated above, an axial gradient within the second zone, the degree of crystallinity preferably decreasing from a first end of the second zone in contact with the first zone toward a second end of the second zone in contact with the tubular body. In this case, the degree of crystallinity may vary linearly depending on the position on the longitudinal axis in the second zone, from the first end toward the second end. Alternatively, the degree of crystallinity varies nonlinearly in the axial direction.

The degree of crystallinity may exhibit a radial gradient within the second zone, the degree of crystallinity preferably decreasing from an outer surface 27 of the preform toward an inner surface 26 of the preform. In this case, the degree of crystallinity may vary substantially linearly in the second zone in the radial direction between the inner surface of the preform and the outer surface of the preform. Alternatively, the degree of crystallinity varies nonlinearly in the radial direction.

It is the diffusion of heat through the material that governs this variation in the degree of crystallinity within the thickness starting from the highest degree of crystallinity on the outside. The presence of water originating from the moisture uptake, within the plastic material of the neck 11 during the step 15, improves the thermal conductivity of the neck 3 and the obtaining of the desired crystallization, in a reproducible manner.

Figure 8:
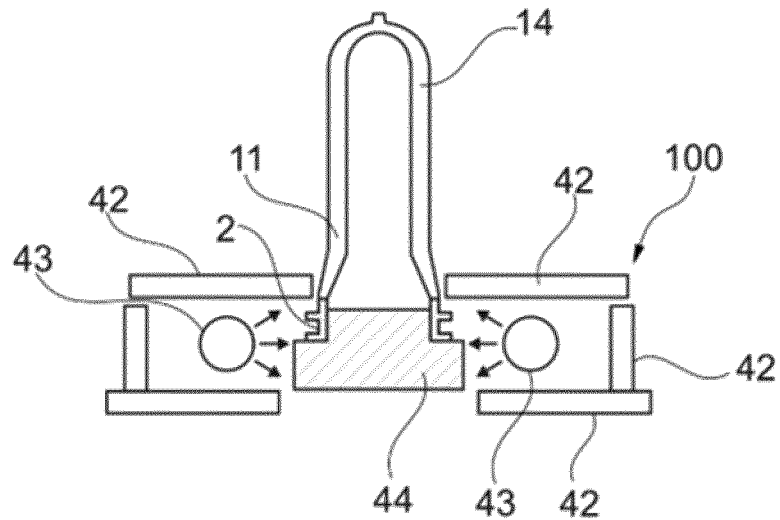

FIG. 8 shows an example of a heating device 100 that can be used in the heat treatment step of the preform in order to heat the first zone 30 and partially heat the second zone 31 so as to cause at least partial crystallization of the polymer.

The heating device 100 has a plurality of mirrors 42 that make it possible to limit the heating achieved by infrared radiation lamps 43 to the intended zones. The preform 11 is capped by an oven mandrel 44 that is inserted into the opening in the neck 3 and extends inside the neck 3 as far as the lower limit of the first zone 30. In a variant, one or more mirrors have indentations so as to promote the crystallinity gradient in the second zone 31.

Figure 9:
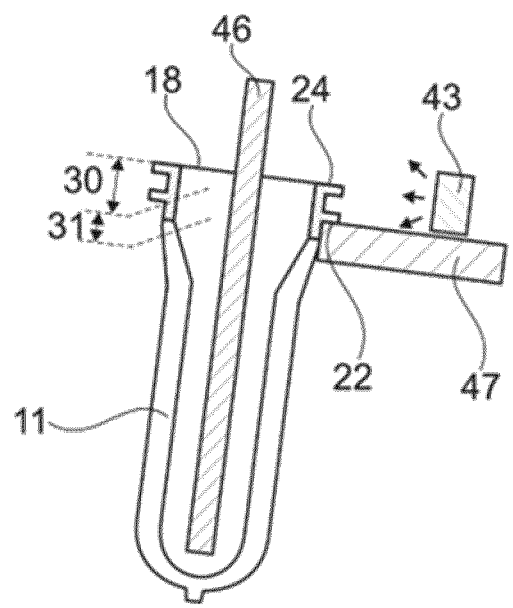
FIG. 9 is a view, similar to FIG. 8, of a variant of the heat treatment device.

Another example of a heating device 100 has been illustrated in FIG. 9. In this example, an infrared radiation lamp 43 is disposed on the outside of the preform 11 in the zone situated around the neck 3. A cooling bar 47 is brought close to the preform from the outside, under the flange 22. In this example, a rod 46 has been inserted through the opening in the neck 3 along the longitudinal axis X and is present inside the tubular body 14. The rod 46 causes the preform to rotate on itself in such a way that the entire perimeter is heated uniformly and cooled uniformly.

During heating, an axial heating-temperature gradient is created in the space around the preform, because of the cooling bar 47, so as to limit the diffusion of heat into the material.

The cooling of the preform after heating may be effected using natural convection, that is to say relatively slowly, so as to finalize crystallization.

The cooling duration is for example longer than 30 s, in particular between 30 s and 10 min. The cooling is therefore slow, at ambient temperature.

Once the crystallizing heat treatment has been carried out, the preform is transferred to a stretch-blow-molding station so as to form, in a stretch-blow-molding step 17, the body 2 with its final shape, as shown in FIG. 3. The body 2 has for example, as illustrated, a shape that flares downward as far as a rounded base 7, provided with an indentation 9 on its lower face 8. If necessary, a prior step of heating the preform is carried out before blow-molding.

Finally, the body of the bottle can be equipped with the dispensing head 5 and filled in the step 19.

Of course, the invention is not limited to the example that has just been given.

For example, the moisture uptake can be effected by making use of the natural humidity of the air rather than by using an air-conditioning installation.

The invention applies to bottles that are not pressurized. In this case, the crystallization, in particular of the neck, makes it possible to stiffen certain areas of the bottle and thus to reduce the amount of material used to produce the bottle while having the desired mechanical performance.

The crystallization may exhibit other forms than the one described above, for example with nonuniform crystallization about the longitudinal axis of the neck.

The invention claimed is:

1. A method for manufacturing an injection-molded article made of a crystallizable polymer material, the article having at least one crystallized part, the method comprising:
    a) producing an injection-molded article by injecting the crystallizable polymer into a mold,
    b) storing the injection-molded article for at least 1 month under a relative humidity of at least 60% and at a storage temperature from 5° C. to 35° C. such that it undergoes moisture uptake of at least 0.4% by weight,
    c) crystallizing the injection-molded article after the storage b) by heating and then cooling the injection-molded article.

2. The method as claimed in claim 1, wherein the relative humidity of the storage b) is at least 80%.

3. The method as claimed claim 1, wherein the injection-molded article is stored in a large bag during the storage b).

4. The method as claimed in claim 1, wherein the crystallizable polymer material is polyethylene terephthalate (PET).

5. The method as claimed in claim 1, wherein the crystallization is carried out with the aid of a heating device.

6. The method as claimed in claim 5, wherein the heating device comprises at least one infrared radiation lamp.

7. The method as claimed in claim 5, wherein at least one cooling bar is brought close to the preform from the inside or outside thereof, simultaneously with the heating.

8. The method as claimed in claim 1, wherein the injection-molded article is a preform of a bottle.

9. The method as claimed in claim 8, wherein said crystallized part is the neck of the bottle preform.

10. The method as claimed in claim 8, wherein said bottle is an aerosol bottle.

11. The method as claimed in claim 8, wherein said bottle is a pump-action bottle.

12. A method for manufacturing a bottle, wherein the bottle is formed by stretch-blow-molding the injection-molded article having a crystallized part obtained by the method as claimed in claim 1.

13. The method as claimed in claim 1, wherein said injection-molded article has a tubular body closed at one end.

14. The method as claimed in claim 1 wherein the temperature of the storage b) is between 15° C. and 25° C.

15. The method as claimed in claim 1, wherein, during storage b), the injection-molded article undergoes a moisture uptake of between 1% and 3% by weight.

* * * * *